United States Patent Office 3,798,176
Patented Mar. 19, 1974

3,798,176
METHOD FOR MANUFACTURING A CATALYST AND ITS CARRIER HAVING A VACANT CENTER OR A DENSE CENTER
Takeo Ao, Osaka, Japan, assignor to Osaka Yogyo Kabushiki Kaisha, Osaka, Japan
No Drawing. Continuation-in-part of abandoned application Ser. No. 860,084, Sept. 22, 1969. This application Apr. 12, 1972, Ser. No. 243,472
Claims priority, application Japan, July 19, 1968, 43/50,565
Int. Cl. B01j 11/00, 11/40, 11/82
U.S. Cl. 252—437                9 Claims

ABSTRACT OF THE DISCLOSURE

This invention relates to a method for manufacturing a catalyst and its carrier having a vacant center or a dense center. Such a carrier is made into pellet form by covering a desired core with a finely divided material, drying and calcining the resultant pellet. Such a catalyst is made of a carrier to which a solution containing a catalytic compound is impregnated, after which the impregnated carrier is calcined.

---

This is a continuation-in-part of applicant's copending application Ser. No. 860,084, filed Sept. 22, 1969, now abandoned.

This invention relates to a method for manufacturing a carrier suitable for manufacturing a catalyst, characterized by mixing a special admixture, as illustrated and defined hereinafter, with (1) a finely divided material selected from γ-alumina, η-alumina and aluminium hydroxide; or (2) a finely divided material selected from amorphous silica and a silica gel; or (3) a mixture of the finely divided material as indicated in (1) and the finely divided material as indicated in (2) in a weight ratio of 9:1 to 1:9 of the former to the latter depending upon the object of this invention; or (4) a mixture of the finely divided material as indicated in (1) and (2) or in (3) and a compound of at least one element selected from the group consisting of Co, Mo, Ni, Cr, Zn, Fe, Cu, S, W, Pt and the like; or (5) a natural or synthesized zeolite powder; or (6) an oxide of at least one element selected from the group consisting of Fe, Zn, Ti, Mn, Th, U and the like, pulverizing the resultant mixture into particles of such size as to pass through the Tyler Standard's 65 mesh sieve, covering a core, which is made of a desired material into the desired size and shape, depending upon the service conditions, with the pulverized particles to form a pellet, drying and calcining the resultant pellet to produce a carrier having a vacant center or a dense center and a desired density for adjusting the surface area. Further, this invention relates to a method for manufacturing a catalyst by using the carrier as mentioned above, characterized by impregnating said carrier with an aqueous solution containing at least one catalytic component selected from the group consisting of Co, Mo, Ni, Cr, Zn, Fe, Cu, W, Pt and the like and calcining the impregnated carrier to produce said catalyst having a vacant center or a dense center and a desired density depending upon the service conditions.

Generally speaking, it is conventional that the outer part and the center part of the usual carriers and catalysts are made of the same raw material, and also that a certain catalyst is made of a carrier, which is made of metallic oxides, by impregnating only the outer part of the carrier with catalytic compounds. When such carriers and catalysts are used in contact with a gaseous material, only the outer part of said catalysts is effective for carrying out a catalytic reaction and the center part of said catalysts is substantially catalytically ineffective. In other words, the expensive carrier or metallic oxide existing in the center part of the catalyst is substantially catalytically ineffective and much of the catalytic material is essentially inactive. This situation is increased as the size of the catalyst is enlarged. Also, when the carrier and the catalyst are made of the same material in the outer part and center part, the density of the catalyst cannot be varied according to the weight ratio of the carrier to the metallic compound and it is impossible to control the density of the carrier and the catalyst for obtaining their optimum density when a catalytic reaction of a flow gas takes place. In order to eliminate such a defect, some attempts have heretofore been made to overcome the problem by changing the size of the carriers and the catalysts or by changing the shape of them into a cylinder or a ring, such as a spiral or a Raschig ring, but such attempts have not been successful, in that the shaping is troublesome, the cost is high and the dead surface between the particles of the catalyst is formed by the close face contact when the catalyst is used.

Now the inventor has found a new method for controlling the density of the carrier and the catalyst to an optimum density for carrying out the high catalytic reaction by using a central core which is inserted at the central part of the carrier and made of a desired material into various shapes such as a sphere or a polyhedron. Such a new method can produce a pellet carrier and a pellet catalyst by directly using a finely divided material and thus there exists an essential difference between this method and the conventional method of forming a pellet in which, for example, a bead is formed by dropping a gel into an oil. Also, this new method can produce the pellet carrier and the pellet catalyst by using a special pelletizing machine at low cost; and, furthermore, the carrier and catalyst thus-produced possess excellent qualities, as compared with those of conventional products. In the conventional method for the preparation of beads, after the formation of the granules and the drying and calcining thereof, the granules are subject to an ion-exchange procedure for replacing sodium ions with ammonium ions to reduce the content of $Na_2O$, but it is noted that, in accordance with the method of the present invention, the $Na_2O$ content of the product is originally reduced to 0.1% at the maximum or less without the use of the ion-exchange procedure.

As mentioned above, the central core is tightly surrounded with a finely divided material in accordance with the method of this invention and so the cutting section of the carrier and the catalyst made in accordance with this invention may be described as follows:

(1) When the products are the carrier and the catalyst having a vacant center, the diameter (D) of the pellet product is 2 to 25 millimeters and the diameter ($d$) of the central core is 0.5 to 15 millimeters. The relationship between the D and the $d$ is $D \leq 4d$.

(2) When the products are the carrier and the catalyst having a dense center, a spherical or polyhedral core is used.

The diameter (D) of the granular products is 2 to 25 millimeters and the diameter ($d$) of the core is 0.5 to 15 millimeters. The relationship between the (D) and the ($d$) is $D \leq 4d$.

As mentioned above, the central core as explained in the method of this invention is effective only when it has an outer diameter ($d$) of 0.5 to 15 millimeters and the relationship of $$d \geq \frac{D}{4}$$

If the core has an outer diameter of below 0.5 millimeter, the core adheres to the other core and it is difficult to separate the cores into an individual core. If the core has an outer diameter of below $D/4$, the core becomes ineffective even if the density of the central part of the carrier is modified. If the core has an outer diameter of above 15 millimeters, the strength of the carrier is not satisfactory even when the central part of the carrier and the catalyst is burned off to form the vacant core. The quality of such a central core is illustrated as follows:

(1) When the carrier and the catalyst have a vacant center:

The core is made into a ball by pelletizing an organic material such as polystyrene, amorphous cellulose or dextrine, or an inorganic material such as amorphous carbon, 95% or more of which is burned off without causing cracks and other damages to the outer layer of the carrier and catalyst by calcination. Also, such a core has hygroscopic properties, electrostatically attractive properties, no unevenness on the surface of the core, and the core is spherical. A vacant center product made of $\alpha$-alumina produced by the air-blowing of the fused material is sold commercially and such a technique is substantially different from the method of this invention.

(2) When the carrier and the catalyst have a dense center:

(A) when the core is spherical: The core is made into a ball having the desired size by pelletizing and firing $\alpha$-alumina, fused silica or a siliceous material and the carrier and catalyst having the thus-made core are strengthened by calcination of the carrier and catalyst, and cracks or other damages are not produced in the carrier and catalyst when they are used for carrying out the reaction. Also, such a core has a porosity of above 5% and an hygroscopic property on the surface of the core.

(B) When the core is polyhedral: This polyhedral core is made of the same material as the spherical core. Such a polyhedral core is used especially for securing the close adherence between the outer part and the center part of the carrier and catalyst and for preventing the segregation of the outer part from the center part of the carrier and catalyst when they are used.

The method of this invention and the physical properties of the products to be obtained by this invention are fully explained by the examples indicated hereinafter, and the advantageous effects of this invention are as follows:

(1) Effects from the point of view of quality:

(A) The carrier and the catalyst prepared in accordance with the method of this invention have excellent qualities, and their density and surface area can be controlled to the optimum density and surface area for treating a flow of gas where the catalytic reaction takes place.

(B) According to the method of this invention, the costly materials used for the preparation of the carrier such as metallic compounds may be used only for qualifying the depth of the surface layer of the carrier which is contacted with a gas to be reacted therewith. This procedure avoids wasting such costly materials.

(C) When the high density core is used as a center part, the physical strength of the carrier and catalyst can be increased.

(D) When the catalyst and carrier having a vacant center are used, the specific surface area of the carrier and catalyst can be increased, and the pressure loss of the gas can be reduced.

(2) Effects from the point of view of industrial technique.

(A) According to the method of this invention, the maker can manufacture the carrier and the catalyst on a large scale at low cost because of its simple manufacturing process.

(B) The user can use the carrier and catalyst with high efficiency by maintaining the gas flow at a constant rate and preventing the floating up of the catalyst, because the carrier and the catalyst are in a spherical pellet form, and the density of the carrier and the catalyst can be controlled as desired when they are used for carrying out various catalytic operations.

The invention is illustrated by the following examples.

EXAMPLE 1

This example illustrates a carrier having a hollow center.

125 weight parts of $\gamma$-alumina containing about 80% of $Al_2O_3$ were mixed with 4 weight parts of a binder containing micro-crystalline cellulose which is sold in the U.S.A. under the trade name of Avicel ammonium carbonate and aluminum chloride in the weight ratios of 2:1:1 in a V-type mixer and the resultant mixture was pulverized in a pulverizer to produce a carrier-forming material having a size passing through the Tyler Standard's 65 mesh sieve.

Cores were prepared by pelletizing starch, which contains about 20 weight percent water, into spheres having a diameter of about 1.8 millimeters by using a pelletizer equipped with a plate having many U-shaped notches, rotating at the speed of 300 r.p.m.

The spherical cores were sprayed with water and then coated with the carrier-forming material in the pelletizer to produce small pellets and these were then sprayed with additional water and coated with an additional carrier-forming material to produce large pellets having a water content of about 40 weight percent. The large pellets were then passed through a sieve for obtaining pellets having a diameter of about 3.5 millimeters. The pellets were dried and then calcined at 600° C. for 4 hours to produce the carrier having a hollow center and having a diameter of about 1.5 millimeters.

In this case, it is noted that the cores were burned off under calcination.

It was found from the test results that the carrier had a diameter of about 3.0 millimeters, a packed density of 0.67 kg./liter, and apparent density of 3.16, a specfic surface area of 124 m.$^2$/gram and good mechanical strength against compression.

EXAMPLE 2

This example illustrates a carrier having a uniform center.

This example was repeated in the same manner as in Example 1, with the exception that the cores were prepared by pelletizing a mixture of the carrier-forming material which was prepared as in Example 1 and about 40 wt. percent of water in place of the starch used in Example 1.

In this case, it is noted that the sieved pellets had a diameter of about 3.5 millimeters and the core had a diameter of about 1.8 millimeters and also that the cores were not burned off under calcination at 600° C. for 4 hours, but rather, were retained in the carrier as the uniform center having a diameter of about 1.5 millimeters.

It was found from the test results that the carrier had a diameter of about 3.0 millimeters, a packed density of 0.76 kg./liter, an apparent density of 3.23, a specific surface area of .115 m.$^2$/gram and excellent mechanical strength against compression.

EXAMPLE 3

This example illustrates a carrier having a dense center. This example was repeated in the same manner as in Example 1, with the exception that the cores having a diameter of about 1.5 millimeters were prepared by replacing the starch used in Example 1 with a finely divided mixture of 100 parts of $\alpha$-$Al_2O_3$, 2 parts of starch and 1 part of aluminum chloride containing about 35 weight percent of water. The cores were calcined at 1350° C., for 4 hours to given an apparent density of 3.5.

In this case, it is noted that the sieved pellets had a diameter of about 3.3 millimeters and that the cores were not burned off under calcination of the sieved pellets at 600° C. but rather were retained in the carrier as a dense center having an apparent density of 3.3 and a diameter of about 1.5 millimeters.

It was found from the test results that the carrier had a diameter of about 3.0 millimeters, a packed density of 0.85 kg./liter, an apparent density of 3.28, a specific surface area of 110 m.$^2$/gram and excellent mechanical strength against compression.

EXAMPLE 4

This example illustrates a carrier having a hollow center.

12.5 weight parts of $\gamma$-alumina containing about 80% of $Al_2O_3$ and 106 weight parts of amorphous silica containing about 85% of $SiO_2$ were mixed with 6 weight parts of a binder containing microcrystalline cellulose, starch and ammonium carbonate in the weight ratios of 3:2:1 in a V-type mixer, and the resultant mixture was pulverized in a pulverizer to produce a carrier-forming material having a size passing through the Tyler Standard's 65 mesh sieve.

The cores were prepared by pelletizing microcrystalline cellulose containing about 20 weight percent of water, into spheres having a diameter of about 1.9 millimeters by using the pelletizer used in Example 1.

The spherical cores were sprayed with water and coated with the carrier-forming material in the pelletizer to produce small pellets and these small pellets were sprayed with additional water and then coated with additional carrier-forming material to produce large pellets having a water content of about 35%. The large pellets were then passed through a sieve for obtaining pellets having a diameter of about 3.7 millimeters. The pellets were dried and then calcined at 550° C. for 4 hours to produce a carrier having a hollow center and a diameter of about 1.5 millimeters.

In this case, it is noted that the cores were burned off under calcination.

It was found from the test results that the carrier had a diameter of about 3.0 millimeters, a packed density of 0.54 kg./liter, an apparent density of 2.37, a specific surface area of 235 m.$^2$/gram and excellent mechanical strength against compression.

EXAMPLE 5

This example illustrates a carrier having a uniform center. This example was repeated in the same manner as in Example 4, with the exception that the cores were prepared by pelletizing a mixture of the carrier-forming material which was prepared as in Example 4 and about 35 weight percent of water in place of microcrystalline cellulose.

In this case, it is noted that the sieved pellets had a diameter of about 3.7 millimeters and that the cores were not burned off under calcination of the sieved pellets at 550° C. for 4 hours but were retained in the carrier as a uniform center having a diameter of about 1.5 millimeters.

It was found from the test results that the carrier had a diameter of about 3.0 millimeters, a packed density of 0.60 kg./liter, an apparent density of 2.40, a specific surface area of 211 m.$^2$/gram and excellent mechanical strength against compression.

EXAMPLE 6

This example illustrates a carrier having a dense carrier.

This example was repeated in the same manner as in Example 4, with the exception that cores having a diameter of about 1.5 millimeters were prepared by pelletizing a mixture of 100 parts of fused silica ($SiO_2$, 99%), 1 part of ethyl silicate and about 20 weight percent of water in place of microcrystalline cellulose used in Example 4 and the cores were calcined at 550° C. for 4 hours so that they had an apparent density of 3.5.

In this case, it is noted that the sieved pellets had a diameter of about 3.5 millimeters, and that the cores were not burned off under calcination of the sieved pellets but were retained in the carrier as a dense center having an apparent density of 3.5 and a diameter of about 1.5 millimeters.

It was found from the test results that the carrier had a diameter of about 3.0 millimeters, a packed density of 0.72 kg./liter, an apparent density of 2.47, a specific surface area of 179 m.$^2$/gram and excellent mechanical strength against compression.

EXAMPLE 7

This example illustrates a catalyst having a hollow center.

100 weight parts of $\gamma$-alumina containing about 80% of $Al_2O_3$ and 20.0 weight parts of $Cr_2O_3$ were mixed with 3 weight parts of microcrystalline cellulose in a V-type mixer and the resultant mixture was pulverized in a pulverizer to produce a catalyst-forming material having a size passing through the Tyler Standard's 65 mesh sieve.

The cores were prepared by pelletizing a foamable polystyrene into pellets having a diameter of about 0.7 millimeter by using the pelletizer as in Example 1 and then foaming the pellets in water at 100° C. for 30 minutes to produce polystyrene foams which were passed through a sieve for obtaining spherical cores having a diameter of 1.68 to 2.0 millimeters (the average diameter being about 1.8 millimeters).

The spherical cores were sprayed with water and coated with the catalyst-forming material in the pelletizer to produce small pellets and the small pellets were sprayed with additional water and coated with additional catalyst-forming material to produce large pellets having a water content of about 35 weight percent. The large pellets were then passed through a sieve for obtaining pellets having a diameter of 3.36 to 4.0 millimeters (the average diameter being about 3.5 millimeters). The pellets were dried and calcined at 500° C. for 4 hours to produce a catalyst having a hollow center and having a diameter of about 1.5 millimeters.

In this case, it is noted that the cores were burned off under calcination.

It was found from the test results that the catalyst had a diameter of about 3.0 millimeters, a packed density of 1.57 kg./liter, an apparent density of 3.54, a specific surface area of 123 m.$^2$/gram and good mechanical strength against compression.

EXAMPLE 8

This example illustrates a catalyst having a uniform center.

This example was repeated in the same manner as in Example 7, except that cores having a diameter of about 1.8 millimeters were prepared by using the catalyst-forming material in place of the foamable polystyrene of Example 7.

In this case, it is noted that the sieved pellets had a diameter of about 3.5 millimeters, and that the cores were not burned off under calcination of the sieved pellets but were retained in the catalyst as a uniform center having a diameter of about 1.5 millimeters.

It was found from the test results that the catalyst had a diameter of about 3.0 millimeters, a packed density of 1.64 kg./liter, an apparent density of 3.61, a specific surface area of 102 m.$^2$/gram and excellent mechanical strength against compression.

EXAMPLE 9

This example illustrates a catalyst having a dense center.

This example was repeated in the same manner as in Example 7, except that the cores were prepared by replacing foamable polystyrene used in Example 7 with polyhedral particles having a diameter ranging from 1.4 to 1.68 millimeters (the average diameter being 1.5 millimeters) which were produced by crushing fused silica.

In this case, it is noted that the sieved pellets had a diameter of about 3.3 millimeters, and that the cores were not burned off under calcination of the sieved pellets at 500° C. for 4 hours, but were retained in the catalyst as a dense center having an apparent density of 3.5 and diameter of about 1.5 millimeters.

It was found from the test results that the catalyst had a diameter of about 3.0 millimeters, a packed density of 1.73 kg./liter, an apparent density of 3.72, a specific surface area of 92 m.$^2$/gram and excellent mechanical strength against compression.

EXAMPLE 10

This example illustrates a catalyst having a hollow center.

A carrier having a central core of about 1.8 millimeters in diameter was prepared in the same manner as in Example 1, with the exception that the carrier had a vacant center of about 1.8 millimeters in diameter and then the carrier was immersed for 10 minutes in an aqueous solution prepared by mixing an aqueous solution of 3 moles of cobalt nitrate with an aqueous solution of 20% ammonium hydroxide in a volume ratio of 1:1. The carrier thus-treated and a diameter of about 3.0 millimeters. The carrier was dried and then calcined at 550° C. for 4 hours to produce a composite catalyst containing about 3 weight percent of a cobalt oxide and having a hollow center of about 1.5 millimeters in diameter.

It was found from the test results that the catalyst had a diameter of about 3.0 millimeters, a packed density of 0.76 kg./liter, an apparent density of 3.25, a specific surface area of 109 m.$^2$/gram and excellent mechanical strength against compression.

Further, the catalyst was improved in its catalytic activity by reducing it at 400° C. for 2 hours in a hydrogen flow of SV 800/cc./cc./hr.

It was found from the test results that the catalyst had a packed density of 0.73 kg./liter, an apparent density of 3.28, a specific surface area of 140 m.$^2$/gram and excellent mechanical strength against compression.

EXAMPLE 11

This example illustrates a catalyst having a uniform center.

A carrier was prepared in the same manner as in Example 2, with the exception that the carrier had a uniform center of about 1.8 millimeters in diameter and then the carrier was immersed for 10 minutes in an aqueous solution prepared by mixing an aqueous solution of 3 moles of cobalt nitrate with an aqueous solution of 20% of ammonium hydroxide in a volume ratio of 1:1. The carrier thus-treated had a diameter of about 3.0 millimeters. The carrier was dried and calcined at 550° C. for 4 hours to produce a composite catalyst containing about 3 weight percent of a cobalt oxide and having a uniform center of about 1.5 millimeters in diameter.

Further, the catalyst was improved in its catalytic activity by reducing it at 400° C. for 2 hours in the hydrogen flow of SV 800/cc./cc./hr.

It was found from the test results that the catalyst had a diameter of about 3.0 millimeters, a packed density of 0.75 kg./liter, an apparent density of 3.30, a specific surface area of 132 m.$^2$/gram and excellent mechanical strength against compression.

EXAMPLE 12

This example illustrates a catalyst having a dense center.

A carrier was prepared in the same manner as in Example 3, with the exception that the carrier had a dense center of about 1.5 millimeters in diameter and then the carrier was immersed for 10 minutes in an aqueous solution prepared by mixing an aqueous solution of 3 moles of cobalt nitrate with an aqueous solution of 20% ammonium hydroxide in a volume ratio of 1:1. The carrier thus-treated had a diameter of about 3.0 millimeters. This carrier was dried and then calcined at 550° C. for 4 hours to produce a composite catalyst containing about 3 weight percent of a cobalt oxide and having a dense center of about 1.5 millimeters in diameter.

Further, the catalyst was improved in its catalytic activity by reducing it in a hydrogen flow of SV 800/cc./cc./hr.

It was found from the test results that the catalyst had a diameter of about 3.0 millimeters, a packed density of 0.78 kg./liter, an apparent density of 3.34, a specific surface area of 118 m.$^2$/gram and excellent mechanical strength against compression.

EXAMPLE 13

This example illustrates a catalyst having a hollow center.

100 weight parts of $\gamma$-$Al_2O_3$, 10 weight parts of $Cr_2O_3$ and 10 weight parts of CuO were mixed with 3 weight parts of microcrystalline cellulose in a V-type mixer and the resultant mixture was pulverized in a pulverizer to produce a catalyst-forming material having a size passing through the Tyler Standard's 65 mesh sieve.

The cores were prepared in the same manner as in Example 7, with the exception that the cores had a diameter of about 2.5 millimeters.

The spherical cores were sprayed with water and then coated with the catalyst-forming material in the same manner as in Example 7, except that the sieved pellets had a diameter of about 5.9 millimeters.

The pellets were dried and then calcined at 550° C. for 4 hours to produce a catalyst having a diameter of about 5.0 millimeters and a hollow center of about 2.0 millimeters in diameter.

Further, the catalyst was improved in its catalytic activity by reducing it at 400° C. for 2 hours in a hydrogen flow of SV 800/cc./cc./hr.

EXAMPLE 14

This example illustrates a catalyst having a uniform center.

This example was repeated in the same manner as in Example 13, with the exception that the cores were prepared by using the catalyst forming material of Example 13 in place of the foamable polystyrene and also that the catalyst-forming material was mixed with 30 weight percent of water.

The pellets were dried and then calcined at 550° C. for 4 hours to produce a catalyst having a diameter of about 5.0 millimeters and a uniform center of about 2.0 millimeters in diameter.

The catalyst was improved in its catalytic activity in the same manner as in Example 13.

EXAMPLE 15

This example illustrates a catalyst having a dense center.

Example 3 was repeated for preparing a dense core having a diameter of about 2.0 millimeters in diameter and the dense core was coated with the catalyst-forming material which was prepared as in Example 13 to produce a carrier having a diameter of about 5.5 millimeters.

The carrier was dried and then calcined at 550° C. for 4 hours to produce a catalyst having a diameter of about 5.0 millimeters and the dense center of about 2.0 millimeters in diameter.

The catalyst was improved in its catalytic activity in the same manner as in Example 13.

EXAMPLE 16

This example illustrates a catalyst having a hollow center.

112.5 weight parts of γ-Al₂O₃ and 12.5 weight parts of ammonium molybdenate were mixed with 3 weight parts of a binder containing microcrystalline cellulose and ammonium acetate in the weight ratio of 2:1 in a V-type mixer and the resultant mixture was pulverized in a pulverizer to produce a catalyst-forming material having such a size so as to pass through a Tyler Standard's 65 mesh sieve.

Spherical cores were prepared in the same manner as in Example 7, except that the cores had a diameter of about 0.2 millimeter.

The spherical cores were coated with the catalyst-forming material in the same manner as in Example 7, except that the pellets had a diameter of about 0.6 millimeter and they were calcined at 550° C. for 4 hours to produce a catalyst.

The catalyst was immersed for 10 minutes in an aqueous solution prepared by mixing an aqueous solution containing cobalt nitrate, corresponding to 4 weight percent of cobalt oxide (CoO), with an aqueous solution containing 20% ammonium hydroxide in a volume ratio of 1:1. The catalyst thus-treated was dried and then calcined at 500° C. for 4 hours to produce a composite catalyst containing about 4 weight percent of cobalt oxide and about 10 weight percent of MoO₃ and having a diameter of about 0.5 millimeter and a hollow center of about 0.2 millimeter in diameter.

Further, the composite catalyst was improved in its catalytic activity by reducing the metal oxides at 800° C. for 2 hours in a hydrogen flow of SV 800/cc./hr.

EXAMPLE 17

This example illustrates a catalyst having a uniform center.

This example was repeated in the same manner as in Example 16, with the exception that the spherical cores were prepared by pelletizing a mixture of the catalyst-forming material used in Example 16 and 30 weight percent of water in place of the formable polystyrene used in Example 7.

The composite catalyst had a diameter of about 0.5 millimeter and a uniform center of about 0.2 millimeter in diameter. The composite catalyst was improved in its catalytic activity in the same manner as in Example 16.

EXAMPLE 18

This example illustrates a catalyst having a dense center.

This example was repeated in the same manner as in Example 16 with the exception that the spherical cores were prepared as in Example 3 and the pellets formed had a diameter about about 0.55 millimeter.

The composite catalyst had a diameter of about 0.5 millimeter and a dense center of about 0.2 millimeter in diameter. The composite catalyst was improved in its catalytic activity in the same manner as in Example 16.

EXAMPLE 19

This example illustrates a catalyst having a hollow center.

In this example, a carrier-forming material having such a size as to pass through a Tyler Standard's 65 sieve was prepared as in Example 1 and spherical cores were prepared as in Example 7, except that the spherical cores had a diameter of about 10.0 millimeters. The spherical cores were coated with a carrier-forming material as in Example 1, except that the sieve pellets had a diameter of about 20.0 millimeters.

The pellets were dried and then calcined at 1350° C. for 4 hours to produce a carrier having a diameter of about 15.0 millimeters and a hollow center of about 7.5 millimeters in diameter. The carrier was immersed for 10 minutes in an aqueous solution containing nickel nitrate. The carrier thus-treated was then calcined at 550° C. for 4 hours to produce a catalyst containing about 5 weight percent of NiO.

EXAMPLE 20

This example illustrates a catalyst having a hollow center.

100 weight parts of γ-alumina were mixed with 3 weight parts of a binder containing microcrystalline cellulose and starch in the weight ratio of 2:1 in a V-type mixer and the resultant mixture was pulverized in a pulverizer to produce a carrier-forming material having a size passing through a Tyler Standard's 65 mesh sieve.

Spherical cores were prepared in the same manner as in Example 7, except that the cores had a diameter of about 1.0 millimeter.

The spherical cores were coated with the carrier-forming material as in Example 1, except that the sieved pellets had a diameter of about 2.0 millimeters.

The pellets were dried and then calcined at 900° C. for 4 hours to produce a carrier having a diameter of about 1.6 millimeters and a hollow center of about 0.8 millimeter in diameter. The carrier was immersed for 10 minutes in an aqueous solution containing hexachloroplatinic acid. Then the carrier thus-treated was calcined at 550° C. for 4 hours to produce a catalyst containing about 0.2 weight percent of platinum.

The special admixture of the present invention contains three components—A, B and C. The component A is selected from microcrystalline cellulose, starch, dextrine, polyvinyl alcohols and amines. The component A gives plasticity to the non-plastic materials and gives fluidity and water-retentivity to the non-plastic materials when they are molded into a pellet. Also, component A acts to prevent the occurrence of cracks when the carrier and catalyst are dried by heating at a temperature of 60° C. to 120° C. Component B is selected from the group consisting of carbonates, and phosphates of alkali metals, ammonium chloride, ammonium phosphate, ammonium carbonate, and ammonium acetate. Component B gives plasticity to the non-plastic materials and acts for preventing the occurrence of cracks when the carrier is calcined at a temperature of 500° C. to 1350° C. Component C is selected from aluminum chloride, aluminum phosphate and aluminum sulfate. Component A is substantially vaporized at 500° C. and components B and C act for reducing the calcining temperature of the non-plastic materials such as γ-alumina, SiO₂ and oxides of Fe, Zn, U and the like.

It should be noted that the special admixture is added to the non-plastic material in an amount of 2 to 8% and that one or more components selected from components B and C can be used in a weight ratio of 2 to 6, 0 to 4 and 0 to 4, respectively, depending upon the conditions of the operation. It is necessary to pulverize the non-plastic materials to a particle size passing through the Tyler Standard screen in 65 meshes for producing a carrier having a smooth surface with high yield because the unevenness of the carrier and catalyst brings about an inferrior product. Also, it is necessary to calcine at a temperature of 500° C. to 1350° C. to produce the high quality carrier and catalyst. When calcined at a temperature below 500° C., the physical strength of the carrier and catalyst is decreased, and when calcined at a temperature of about 1350° C., the carrier or the catalyst is reduced in activity.

What is claimed is:

1. A method for the manufacture of a carrier having a hollow center suitable for manufacturing a catalyst, comprising the steps of:
    (a) mixing a non-plastic material selected from the group consisting of γ-alumina, η-alumina, aluminum hydroxide, amorphous silica and silica gel with 2 to 8 weight percent of a binder containing a component (A), a component (B) and a component (C) in the weight ratios of 2 to 6:0 to 4:0 to 2;
(b) pulverizing the resultant mixture to produce a carrier-forming material having a size passing through a Tyler Standard's 65 mesh sieve;
(c) coating the carrier-forming material on the surface of a central core having a diameter $(d)$ of 0.2 to 20 millimeters to produce a pellet;
(d) drying the pellet; and
(e) calcining the pellet at a temperature of from 500 to 1350° C. to burn off said central core and to produce a carrier having a diameter (D) of 0.5 to 25 millimeters and a hollow center, said component (A) being selected from the group consisting of microcrystalline cellulose, dextrine, starch, and polyvinyl alcohols; said component (B) being selected from the group consisting of carbonates and phosphates of alkali metals, ammonium chloride, ammonium phosphate, ammonium carbonate and ammonium acetate; said component (C) being selected from the group consisting of aluminum chloride, aluminum phosphate and aluminum sulfate; said central core being formed by pelletizing a member selected from the group consisting of microcrystalline cellulose, starch, dextrine and amorphous carbon; or said central core being formed by the foaming of a foamable polystyrene in water at 100° C. and the relationship between the (D) and the $(d)$ being indicated by the equation $D \leq 4d$.

2. A method for the manufacture of a carrier having a uniform center suitable for manufacturing a catalyst, comprising the steps of:
(a) mixing a non-plastic material selected from the group consisting, of γ-alumia, η-alumina, aluminum hydroxide, amorphous silica and silica gel with 2 to 8 weight percent of a binder containing a component (A), a component (B) and a component (C) in the weight ratios of 2 to 6:0 to 4:0 to 2;
(b) pulverizing the resultant mixture to produce a carrier-forming material having a size passing through a Tyler Standard's 65 mesh sieve;
(c) coating the carrier-forming material on the surface of a central core having a diameter $(d)$ of 0.2 to 20 millimeters to produce a pellet;
(d) drying the pellet; and
(e) calcining the pellet at a temperature of from 500 to 1350° C. to retain said central core as the uniform center and to produce a carrier having a diameter (D) of 0.5 to 25 millimeters and a uniform center; said component (A) being selected from the group consisting of microcrystalline cellulose, dextrine, starch and polyvinyl alcohols; said component (B) being selected from the group consisting of carbonates and phosphates of alkali metals, ammonium chloride, ammonium phosphate, ammonium carbonate and ammonium acetate; said component (C) being selected from the group consisting of aluminum chloride, aluminum phosphate and aluminum sulfate; said central core being formed by pelletizing said carrier forming material, and the relationship between the (D) and the $(d)$ being indicated by the equation $D \leq 4d$.

3. A method for the manufacture of a carrier having a dense center suitable for manufacturing a catalyst, comprising the steps of:
(a) mixing a non-plastic material selected from the group consisting of γ-alumina, η-alumina, aluminum hydroxide, amorphous silica and silica gel with 2 to 8 weight percent of a binder containing a component (A), a component (B) and a component (C) in the weight ratios of 2 to 6:0 to 4:0 to 2;
(b) pulverizing the resultant mixture to produce a carrier-forming material having a size passing through a Tyler Standard's 65 mesh sieve;
(c) coating the carrier-forming material on the surface of a central core having a diameter $(d)$ of 0.2 to 20 millimeters to produce a pellet;
(d) drying the pellet; and
(e) calcining the pellet at a temperature of from 500 to 1350° C. to retain said central core as the dense center and to produce a carrier having a diameter (D) of 0.5 to 25 millimeters and a dense center, said component (A) being selected from the group consisting of microcrystalline cellulose, dextrine, starch and polyvinyl alcohols; said component (B) being selected from the group consisting of carbonates and phosphates of alkali metals, ammonium chloride, ammonium phosphate, ammonium carbonate and ammonium acetate; said component (C) being selected from the group consisting of aluminum chloride, aluminum phosphate and aluminum sulfate; said central core being formed by pelletizing a member selected from the group consisting of α-alumina, fused silica and fused alumina; or said central core being produced by firing the pellets which are prepared by pelletizing α-alumina or electro fused alumina; or said central core being prepared by crushing the fused silica, α-alumina or fused alumina into the polyhedral shape, and the relationship between the (D) and the $(d)$ being indicated by the equation $D \leq 4d$.

4. A method for the manufacture of a catalyst having a hollow center, comprising the steps of:
(a) mixing a non-plastic material and a catalytically active metal and then reduced in the presence of $H_2$ binder containing a component (A), a component (B) and a component (C) in the weight ratios of 2 to 6:0 to 4:0 to 2;
(b) pulverizing the resultant mixture to produce a catalyst-forming material having a size passing through a Tyler Standard's 65 mesh sieve;
(c) coating the catalyst-forming material on the surface of a central core having a diameter $(d)$ of 0.2 to 20 millimeters to produce a pellet;
(d) drying the pellet; and
(e) calcining the pellet at a temperature from 500 to 1350° C. to burn off said central core and to produce a catalyst having a diameter (D) of 0.5 to 25 millimeters and a hollow center; and if desired, the catalyst is impregnated with cations of a catalytically active metal and then reduced in the presence of $H_2$ at elevated temperatures, said non-plastic material being selected from the group consisting of γ-alumina, η-alumina, aluminum hydroxide, amorphous silica and silica gel; said catalytically active component being selected from the group consisting of Co, Mo, Ni, Cr, Zn, Fe, Cu, W and Pt; said component (A) being selected from the group consisting of microcrystalline cellulose, dextrine, starch and polyvinyl alcohols; said component (B) being selected from the group consisting of carbonates and phosphates of alkali metals, ammonium chloride, ammonium phosphate, ammonium carbonate and ammonium acetate; said component (C) being selected from the group consisting of aluminum chloride, aluminum phosphate and aluminum sulfate; said central core being formed by pelletizing a member selected from the group consisting of polystyrene microcrystalline cellulose, starch, dextrine and amorphous carbon; or said central core being formed by the foaming of a foamable polystyrene in water at 100° C.; the relationship between (D) and $(d)$ being indicated by the equation $D \leq 4d$.

5. A method for the manufacture of a catalyst having a uniform center, comprising the steps of:
(a) mixing a non-plastic material and a catalytically active component with 2 to 8 weight percent of a binder containing a component (A), a component (B) and a component (C) in the weight ratios of 2 to 6:0 to 4:0 to 2;

(b) pulverizing the resultant mixture to produce a catalyst-forming material having a size passing through a Tyler Standard's 65 mesh sieve;
(c) coating the catalyst-forming material on the surface of a central core having a diameter $(d)$ of 0.2 to 20 millimeters to produce a pellet;
(d) drying the pellet; and
(e) calcining the pellet at a temperature of from 500 to 1350° C. to retain said central core as the uniform center and to produce a catalyst having a diameter $(D)$ of 0.5 to 25 millimeters and a uniform center; and, if desired, the catalyst is impregnated with cations of a catalytically active metal and then reduced in the presence of $H_2$ at elevated temperatures; said non-plastic material being selected from the group consisting of $\gamma$-alumina, $\eta$-alumina, aluminum hydroxide, amorphous silica and silica gel; said catalytically active component being selected from the group consisting of Co, Mo, Ni, Cr, Zn, Fe, Cu, W and Pt; said component (A) being selected from the group consisting of microcrystalline cellulose, dextrine, starch and polyvinyl alcohols; said component (B) being selected from the group consisting of carbonates and phosphates of alkali metals, ammonium chloride, ammonium phosphate, ammonium carbonate and ammonium acetate; said component (C) being selected from the group consisting of aluminum chloride, aluminum phosphate and aluminum sulfate; said central core being formed by pelletizing said catalyst-forming material; and the relationship between $(D)$ and $(d)$ being indicated by the equation $D \leq 4d$.

6. A method for the manufacture of a catalyst having a dense center, comprising the steps of:
(a) mixing a non-plastic material and a catalytically active component with 2 to 8 weight percent of a binder containing component (A), a component (B) and a component (C) in the weight ratios of 2 to 6:0 to 4:0 to 2;
(b) pulverizing the resultant mixture to produce a catalyst-forming material having a size passing through a Tyler Standard's 65 mesh sieve;
(c) coating the catalyst-forming material on the surface of a central core having a diameter $(d)$ of 0.2 to 20 millimeters to produce a pellet;
(d) drying the pellet; and
(e) calcining the pellet at a temperature of from 500 to 1350° C. to retain said central core as the dense center and to produce a catalyst having a diameter $(D)$ of 0.5 to 25 millimeters and a dense center; and if desired, the catalyst may be impregnated with cations of a catalytically active metal and then reduced in the presence of $H_2$ at elevated temperatures; said non-plastic material being selected from the group consisting of $\gamma$-alumina, $\eta$-alumina, aluminum hydroxide, amorphous silica, and silica gel; said catalytically active component being selected from the group consisting of Co, Mo, Ni, Cr, Zn, Fe, Cu, W and Pt; said component (A) being selected from the group consisting of microcrystalline cellulose, dextrine, starch and polyvinyl alcohols; said component (B) being selected from the group consisting of carbonates and phosphates of alkali metals, ammonium chloride, ammonium phosphate, ammonium carbonate and ammonium acetate; said component (C) being selected from the group consisting of aluminum chloride, aluminum phosphate and aluminum sulfate; said central core being formed by pelletizing a member selected from the group consisting of $\alpha$-alumina, fused silica and fused alumina; or said central core being produced by firing the pellets which are prepared by pelletizing $\alpha$-alumina or electrofused alumina; or said central core being prepared by crushing the fused silica, $\alpha$-alumina or fused alumina into the polyhedral shape; the relationship between $(D)$ and $(d)$ being indicated by the equation $D \leq 4d$.

7. A method for the manufacture of a catalyst having a hollow center, comprising the steps of:
(a) mixing a non-plastic material selected from the group consisting of $\gamma$-alumina, $\eta$-alumina, aluminum hydroxide, amorphous silica and silica gel with 2 to 8 weight percent of a binder containing a component (A), a component (B) and a component (C) in the weight ratios of 2 to 6:0 to 4:0 to 2;
(b) pulverizing the resultant mixture to produce a carrier-forming material having a size passing through a Tyler Standard's 65 mesh sieve;
(c) coating the carrier-forming material on the surface of a central core having a diameter $(d)$ of 0.2 to 20 millimeters to produce a pellet;
(d) calcining the pellet at a temperature of from 500 to 1350° C. to burn off said central core and to produce a carrier having a hollow center;
(e) dipping the carrier into an aqueous solution containing cations of a catalytically active metal selected from the group consisting of Co, Mo, Ni, Cr, Zn, Fe, Cu, W and Pt;
(f) drying the carrier;
(g) calcining the carrier to produce a catalyst having a diameter $(D)$ of 0.5 to 25 millimeters and a hollow center; and
(h) reducing the catalyst in the presence of $H_2$ at elevated temperatures; said component (A) being selected from the group consisting of microcrystalline cellulose, dextrine, starch and polyvinyl alcohols; said component (B) being selected from the group consisting of carbonates and phosphates of alkali metals, ammonium chloride, ammonium phosphate, ammonium carbonate and ammonium acetate; said component (C) being selected from the group consisting of aluminum chloride, aluminum phosphate and aluminum sulfate; said central core being formed by pelletizing a member selected from the group consisting of microcrystalline cellulose, starch, dextrine and amorphous carbon; or said central core being formed by the foaming of a foamable polystyrene in water at 100° C.; the relationship between $(D)$ and $(d)$ being indicated by the equation $D \leq 4d$.

8. A method for the manufacture of a catalyst having a uniform center, comprising the steps of:
(a) mixing a non-plastic material selected from the group consisting of $\gamma$-alumina, $\eta$-alumina, aluminum hydroxide, amorphous silica and silica gel with 2 to 8 weight percent of a binder containing a component (A), a component (B) and a component (C) in the weight ratios of 2 to 6:0 to 4:0 to 2;
(b) pulverizing the resultant mixture to produce a carrier-forming material having a size passing through a Tyler Standard's 65 mesh sieve;
(c) coating the carrier-forming material on the surface of a central core having a diameter $(d)$ of 0.2 to 20 millimeters to produce a pellet;
(d) calcining the pellet at a temperature of from 500 to 1350° C. to retain said central core as the uniform center and to produce a carrier having a uniform center;
(e) dipping the carrier into an equeous solution containing cations of a catalytically active metal selected from the group consisting of Co, Mo, Ni, Cr, Zn, Fe, Cu, W and Pt;
(f) drying the carrier;
(g) calcining the carrier to produce a catalyst having a diameter $(D)$ of 0.5 to 25 millimeters and a uniform center; and
(h) reducing the catalyst in the presence of $H_2$ at elevated temperatures; said component (A) being selected from the group consisting of microcrystalline cellulose, dextrine, starch and polyvinyl alcohols; said component (B) being selected from the group consisting of carbonates and phosphates of alkali metals, ammonium chloride, ammonium phosphate, ammonium carbonate and ammonium acetate; said component (C) being selected from the group consisting of aluminum chloride, aluminum phosphate and aluminum sulfate; said central core being formed by pelletizing said carrier-forming material; the relationship between (D) and (d) being indicated by the equation $D \leqq 4d$.

9. A method for the manufacture of a catalyst having a dense center, comprising the steps of:
   (a) mixing a non-plastic material selected from the group consisting of γ-alumina, η-alumina, aluminum hydroxide, amorphous silica and silica gel with 2 to 8 weight percent of a binder containing a component (A), a component (B) and a component (C) in the weight ratios of 2 to 6:0 to 4:0 to 2;
   (b) pulverizing the resultant mixture to produce a carrier-forming material having a size passing through a Tyler Standard's 65 mesh sieve;
   (c) coating the carrier-forming material on the surface of a central core having a diameter (d) of 0.2 to 20 millimeters to produce a pellet;
   (d) calcining the pellet at a temperature of from 500 to 1350° C. to retain said central core as the dense center to produce a carrier having a dense center;
   (e) dipping the carrier into an aqueous solution containing cations of a catalytically active metal selected from the group consisting of Co, Mo, Ni, Cr, Zn, Fe, Cu, W and Pt;
   (f) drying the carrier;
   (g) calcining the carrier to produce a catalyst having a diameter (D) of 0.5 to 25 millimeters and a dense center; and
   (h) reducing the catalyst in the presence of $H_2$ at elevated temperatures; said component (A) being selected from the group consisting of microcrystalline cellulose, dextrine, starch and polyvinyl alcohols; said component (B) being selected from the group consisting of carbonates and phosphates of alkali metals, ammonium chloride, ammonium phosphate, ammonium carbonate and ammonium acetate; said component (C) being selected from the group consisting of aluminum chloride, aluminum phosphate and aluminum sulfate; said central core being formed by pelletizing a member selected from the group consisting of α-alumina, fused silica and fused alumina; or said central core being produced by firing the pellets which are prepared by pelletizing α-alumina or electrofused alumina; or said central core being prepared by crushing the fused silica, α-alumina or fused alumina into the polyhedral shape; the relationship between (D) and (d) being indicated by the equation $D \leqq 4d$.

References Cited
UNITED STATES PATENTS

| | | | |
|---|---|---|---|
| 3,145,183 | 8/1964 | Fisher | 252—477 X |
| 3,207,700 | 9/1965 | Saffer | 252—477 X |
| 3,231,520 | 1/1966 | Leak | 252—477 X |
| 2,746,936 | 5/1956 | Plank | 252—465 |
| 3,377,269 | 4/1968 | Bloch | 252—477 R |

CARL F. DEES, Primary Examiner

U.S. Cl. X.R.

252—454, 457, 458, 459, 460, 463, 465, 466 R, 477 R